United States Patent [19]

Shen et al.

[11] 4,265,846

[45] May 5, 1981

[54] METHOD OF BINDING LIGNOCELLULOSIC MATERIALS

[75] Inventors: Kuo-Cheng Shen; David P. C. Fung, both of Ottawa; Louis Calvé, Aylmer, all of Canada

[73] Assignee: Canadian Patents & Development Ltd., Ottawa, Canada

[21] Appl. No.: 82,287

[22] Filed: Oct. 5, 1979

[51] Int. Cl.[3] .............................................. B29J 5/00
[52] U.S. Cl. .................................................. 264/109
[58] Field of Search ......................................... 264/109

[56] References Cited

U.S. PATENT DOCUMENTS

| | | | |
|---|---|---|---|
| 2,786,008 | 3/1957 | Herschler | 260/17.5 |
| 3,141,873 | 7/1964 | Goss | 260/17.5 |
| 3,969,459 | 7/1976 | Fremont et al. | 264/109 |

*Primary Examiner*—Donald E. Czaja
*Assistant Examiner*—James R. Hall
*Attorney, Agent, or Firm*—Ronald G. Bitner

[57] ABSTRACT

A low cost method of binding lignocellulosic materials utilizing ammonium based spent sulfite liquor alone as the binder. Hot pressing a mat comprising lignocellulosic material and ammonium spent sulfite liquor at a temperature above 170° C. decomposes the spent sulfite liquor. The decomposition products subsequently condense and polymerize in the presence of lignocellulosic materials to produce a composite product. An exterior grade board can be produced under certain operating conditions. Utilizing the lower molecular weight fraction of the liquor provides a more efficient binder.

7 Claims, No Drawings

METHOD OF BINDING LIGNOCELLULOSIC MATERIALS

BACKGROUND OF THE INVENTION

This invention relates to a method of binding lignocellulosic materials utilizing ammonium based spent sulfite liquor as the thermosetting adhesive binder.

The most commonly used adhesive binders for binding wood products are urea-formaldehyde and phenol-formaldehyde, with the more expensive phenol-formaldehyde being used for exterior grade products. Using these conventional binders, the cost of the binder itself accounts for a large portion of the total material cost of the wood product.

There have been numerous proposals for utilizing spent sulfite liquor, the by-product of the sulfite pulping process, as an adhesive binder. In U.S. Pat. No. 2,822,358 to Hearon, Lackey and Martin, there is described a process of chemical modification of ammonium based spent sulftie liquor by heat under controlled conditions. The converted liquor is proposed for a variety of water soluble products including adhesives, dispersants and surface active agents. U.S. Pat. No. 3,141,873 to Goss involves heat treating of ammonium based spent sulfite liquor and reacting the treated liquor with a crosslinking agent such as acetone or formaldehyde to produce a thermosetting binder for making cellulosic board. U.S. Pat. No. 2,786,008 to Henschler describes a method of mixing ammonium based spent sulfite liquor with phenol formaldehyde resin and used the resulting mixture as adhesive for fiberboard and plywood. Most of the prior proposals involve extensive chemical modification of the spent sulfite liquor before use as a binder and the cost for producing these modified binders is not significantly lower than conventional adhesives. Moreover, few of these modified binders can produce exterior grade products.

In U.S. patent application No. 898,671 by K. C. Shen, is described a composition in which spent sulfite liquor is treated with sulfuric acid. Although an exterior grade product can be produced by this method at costs less than conventional adhesives the acid treatment complicates the system. In the acid treated spent sulfite liquor it is believed that the sulfuric acid generates free lignosulfonic acid. Under the heat and pressure of the hot pressing operation, the lignosulfonic acid condenses and polymerizes into an insoluble state similar to the condensation reaction of conventional thermosetting resin binders.

SUMMARY OF THE INVENTION

It has been found that ammonium based spent sulfite liquor has a relatively low decomposition temperature and that lignosulfonic acid can be freed without the use of acid as required by spent sulfite liquor of other bases, such as calcium, sodium, and magnesium.

It has been further found that ammonium based spent sulfite liquor can be used directly as a thermosetting binder for lignocellulosic material. Hot-pressing of a mixture of lignocellulosic materials and ammonium spent sulfite liquor at a temperature of 170° C., or higher, provides an in-situ reaction in which the ammonium spent sulfite liquor initially decomposes to free lignosulfonic acid, ammonia gas, and other organic material. These decomposition products subsequently condense and polymerize in the presence of the lignocellulosic materials to produce a composite product.

It has also been found that a fractionated ammonium based spent sulfite liquor containing a greater proportion of low molecular weight materials provides a more efficient binder as compared with an unfractionated liquor. It is believed that low molecular materials other than lignosulfonic acid also play a role in the binding system.

DESCRIPTION OF THE PREFERRED EMBODIMENTS

In accordance with the present invention, the lignocellulosic materials to be bonded are mixed with at least 2%, by weight, ammonium based spent sulfite liquor solids. The ammonium spent sulfite liquor may be in the form of a concentrated liquor or in the form of a spray dried powder as with conventional adhesive binders. The resulting mixture is formed into a mat, and the mat hot pressed at a temperature of 170° C. or higher for a time sufficient to consolidate the mat.

Hot pressing of the mat at temperatures above 170° C. effects two stages of chemical reaction in situ. Firstly, the ammonium based spent sulfite liquor is decomposed to produce free lignosulfonic acid, sulfur dioxide, ammonia gas and other organic material. In the second stage, the decomposition products condense and polymerize in the presence of the lignocellulosic materials to produce a composite product.

Preferably the ammonium spent sulfite liquor is fractionated to provide a higher proportion of low molecular weight materials. Improvement in binder efficiency, particularly required press time, is obtained if the fraction utilized has a molecular weight less than 30,000. This provides a retained portion of approximately 70% of the unfractionated liquor. Preferably the molecular weight is about 10,000, or less, which provides a retained portion of about 30 to 50% of the unfractionated portion. As the maximum molecular weight of the retained fraction is lowered, binder efficiency is improved further, but a smaller portion of liquor is utilized.

Conventional steam heated presses in Canada normally provide a maximum press temperature of about 210° C. When using unfractionated ammonium based spent sulfite liquor as binder, a press temperature of 210° C. is suitable for producing interior grade products but does not provide an exterior grade (waterproof) product with reasonable press times. In order to obtain an exterior grade product either higher press temperature or a post-curing treatment is required. The post-curing treatment involves subjecting the hot-pressed mat to an elevated temperature for a time to further cure the binder. Hot pressing the mat at a temperature of 230° C. or higher allows making an exterior grade product without subsequent heat treatment or long press times. The use of fractionated liquor makes it possible to make exterior grade products without high press temperatures or prolonged press times.

EXAMPLE 1

An ammonium based spent sulfite liquor of 50% solids was obtained from a Canadian sulfite mill. This liquor was spray-dried into powdered form. Before use the powder was ball-milled to give fine particles (90% by weight passed 200 mesh tyler screen). Poplar wafers containing about 3% moisture content obtained from a waferboard plant was blended with 4% by weight ammonium based spent sulfite liquor powder and hot-pressed at 232° C. for a period of 8 and 12 minutes to produce boards 11 mm (7/16 in.) thick and having a density of about 641 kg/m³ (40 pcf). These boards were tested according to Canadian Standard CSA 0188 (75) and the results are summarized in Table 1. The results indicated that these boards would pass the CSA 0188 (75) requirements for exterior grade waferboard.

TABLE 1

| Press time | MOR (psi) | | Torque (in-lb) | |
|---|---|---|---|---|
| | Dry | Wet | Dry | Wet |
| 8 min. | 2820 | 1130 | 54 | 13 |
| 12 min. | 2760 | 1250 | 52 | 16 |

EXAMPLE 2

Poplar waferboards were made under similar conditions as in Example 1 but hot-pressed at a lower press temperature of 210° C. for various times of 16, 14, 10, 8, 6 and 4 minutes. After hot-pressing, some of the boards were post-cured in an oven for a period of 2 and 4 hours at temperatures of 177° C.

In this example, when the press temperature was kept at 210° C. instead of 232° C., and combined with a short press time a follow-up post curing treatment was necessary to obtain boards of exterior grade. Table 2 shows the results of post-curing effect on board properties.

TABLE 2

| Press Time Min. | Press Temp °C. | Post-cured At 177° C. Time Hour | MOR (psi) | | Torque (in-lb) | |
|---|---|---|---|---|---|---|
| | | | Dry | Wet | Dry | Wet |
| 4 | 210 | 2 | 2480 | 1320 | 42 | 14 |
| 6 | 210 | 4 | 2540 | 1200 | 45 | 24 |
| 8 | 210 | 2 | 3410 | 1810 | 85 | 34 |
| 10 | 210 | 0 | 2840 | 0 | 80 | 0 |
| 14 | 210 | 0 | 2860 | 1210 | 72 | 5 |
| 16 | 210 | 0 | 2870 | 1450 | 81 | 27 |

EXAMPLE 3

This example illustrates that similar results can be produced with ammonium based spent sulfite liquor from both softwood and hardwood sulfite pulping process.

Poplar waferboards were made under similar conditions as in Example 2. Ammonia based spent sulfite liquors from softwood species and hardwood species were used as binders for making those boards in Table 3. Both liquors had a solids content of 40%. The pH values for the softwood and hardwood liquors were 4.3 and 2.0 respectively. The liquor was applied to the wafers by spraying at a rate of 4% by weight of liquor solid to wafers. After spraying, the wafers were air dried to a moisture content of about 3.0% before forming mat and hot-pressed.

TABLE 3

| | Press Time At 210° C. Min. | MOR (psi) | | Torque (in-lb) | |
|---|---|---|---|---|---|
| | | Dry | Wet | Dry | Wet |
| Softwood | 12 | 2082 | 0* | 54 | 0* |
| | 14 | 2260 | 1010 | 72 | 5 |
| Hardwood | 12 | 2710 | 1010 | 69 | 6 |
| | 14 | 2810 | 1180 | 69 | 11 |

*Specimens desintegrated during the 2 hours boiling treatment.

EXAMPLE 4

Ammonium based spent sulfite liquor was separated into low and high molecular weight fractions by means of ultrafiltration. Each of these fractions constituted about 50% by weight of the original liquor. The high molecular weight fraction was the retentate which was retained by membranes having a molecular weight cut of 10,000. The low molecular weight fraction was the permeate which passed through the membranes. Waferboard 11 mm thick was made with 4% solids content of fractionated and unfractionated liquor hot pressed at 210° C. for 8 minutes. Table 4 compares the properties of waferboards made with ammonium based spent liquors ($NH_4$-SSL) of different molecular weight ranges. The results show that the low molecular weight fraction is more efficient than the unfractionated original liquor.

TABLE 4

| Molecular Weight Range of $NH_4$-SSL | MOR (psi) | | Torque (in.lb) | |
|---|---|---|---|---|
| | Dry | Wet | Dry | Wet |
| Unfractionated SSL | 2370 | 0 | 50 | 0 |
| Low Molecular Weight SSL (50% of Unfractionated SSL) | 2790 | 1430 | 65 | 14 |
| High Molecular Weight SSL (50% of Unfractionated SSL) | 1000 | 0 | 50 | 0 |

It was found that the ammonium spent sulfite liquor binder of the present invention in liquid form has sufficient tackiness such that prepressing provides a mat with sufficient integrity to enable handling without caul plates.

We claim:

1. A method for binding lignocellulosic materials which comprises; forming a mixture of the lignocellulosic materials and at least 2%, by weight, ammonium based spend sulfite liquor solids, forming a mat with the mixture and hot pressing the mat at a temperature of 170° C., or higher, for a time sufficient for thermosetting and consolidation of the mat to provide a composite product.

2. The method of claim 1 wherein the mat is hot-pressed at 210° C., or higher.

3. The method of claim 1 wherein the hot-pressed mat is subjected to an elevated temperature for a period of time for further thermosetting.

4. The method of claim 1 wherein the mat is hot-pressed at 230° C., or higher.

5. The method of claim 1 wherein the ammonium based spend sulfite liquor used has been fractionated to provide an increased concentration of low molecular weight materials.

6. The method of claim 5 wherein the fractionated liquor has a molecular weight less than 30,000.

7. The method of claim 6 wherein the fractionated liquor has a molecular weight of about 10,000, or less.

* * * * *

UNITED STATES PATENT AND TRADEMARK OFFICE
CERTIFICATE OF CORRECTION

PATENT NO. : 4,265,846

DATED : May 5, 1981

INVENTOR(S) : Kuo-Cheng Shen et al

It is certified that error appears in the above—identified patent and that said Letters Patent is hereby corrected as shown below:

Claims 1 and 5 should read as follows:

1. A method for binding lignocellulosic materials which comprises; forming a mixture of the lignocellulosic materials and at least 2%, by weight, ammonium based spent sulfite liquor solids, forming a mat with the mixture and hot pressing the mat at a temperature of 170°C., or higher, for a time sufficient for thermosetting and consolidation of the mat to provide a composite product.

5. The method of claim 1 wherein the ammonium based spent sulfite liquor used has been fractionated to provide an increased concentration of low molecular weight materials.

Signed and Sealed this

Twenty-sixth Day of October 1982

[SEAL]

Attest:

GERALD J. MOSSINGHOFF

Attesting Officer  Commissioner of Patents and Trademarks